Patented Mar. 6, 1934

1,949,896

UNITED STATES PATENT OFFICE 1,949,896

GASOLINE PRODUCT AND METHOD OF REFINING

August P. Bjerregaard, Okmulgee, Okla., assignor, by mesne assignments, to Gasoline Antioxidant Company, Wilmington, Del., a corporation of Delaware No Drawing. Application September 12, 1929, Serial No. 392,245

18 Claims. (Cl. 44—9)

This invention relates to a process for the treatment of gasolines for the purpose of rendering them resistant to the action of light and particularly to the action of sunlight.

It is well known that most gasolines, especially those gasolines which are blends of cracked gasoline and the so-called straight run gasoline derived directly from natural crude petroleum oils by distillation, lose their clearness when exposed to sunlight and even when exposed to diffused daylight. This loss of clearness is due to a cloudy formation or precipitate which develops in the gasoline because of its exposure, which cloudy formation later separates out as a gummy resinous-like material. Frequently the gasoline becomes discolored due to the action of light, while in other cases the cloudy formation is milkish white.

The result of the action of light on gasoline as above referred to is very detrimental because the cloudiness or discoloration detracts from the appearance of the gasoline and particularly because the gummy resinous material settles out and adheres to the glass sides of measuring cylinders or bowls discoloring them and rendering them unsightly. Furthermore, when the gasoline containing this cloudy formation or resinous material is used as a motor fuel the gummy resinous material has a tendency to deposit in the feed lines, on the parts of the carbureter and other parts of the engine with which it comes into contact and thereby interferes with the proper functioning of the motor.

The object of the present invention is to provide a process for the treatment of gasolines which are subject to the defect or defects referred to above whereby the formation of cloudiness or discoloration therein is prevented when the gasoline is exposed to light.

In accordance with the object stated the invention comprises forming a permanent mixture by adding to the gasoline to be treated a substance which will render the gasoline stable in the presence of light. That is a substance which will prevent the appearance of cloudiness or the formation of gum in the gasoline and thereafter treating the mixture with a filtering clay such as fuller's earth.

Extensive investigation has shown in respect to this phenomenon of cloud formation in gasolines exposed to light, that all substances soluble in gasoline may be divided into three classes, first, those which accelerate the formation of cloud, second, those which retard or prevent the formation of cloud, and third, those which neither accelerate or inhibit and which are, so to speak, indifferent to the phenomenon of cloud formation in gasolines exposed to light.

The novel method of treating gasolines to prevent gum formation is based on the discovery that some substances when mixed with gasoline possess the above mentioned retarding or inhibiting influence on cloud formation when the gasoline mixture is exposed to light. These retarding or cloud preventing substances act efficiently when present in extremely small quantities, suggesting that their effect is due to a catalytic influence, or assuming that light acts as a catalyst in causing the formation of cloud in gasolines, the influence referred to may be more properly called anti-catalytic in its nature since it annuls the action of light. By treating the mixture of gasoline and anti-catalytic material with a filtering clay it has been found that a much smaller quantity of the anti-catalyst may be used to give the proper stability than would otherwise be necessary.

In carrying the process into effect a small quantity of one or more of these substances which retard or prevent the formation of cloud in gasoline when exposed to light is mixed with or dissolved in the gasoline in any convenient manner after which the resulting mixture is brought into intimate contact with fuller's earth or other similar filtering clay. The contacting may be effected either by percolating the gasoline mixture through a bed of the earth or by mixing finely ground earth (100–200 mesh) with the gasoline and then separating the earth from the gasoline by settling or filtration.

Among the substances found to be suitable anti-catalysts in the process are: certain aldehydes, for example, cinnamic aldehyde, furfural, citronellal; certain mercaptans, as for example, ethyl mercaptan, normal butyl mercaptan; certain complex hydrocarbons, as for example, anthracene, phenanthrene and cyclohexene; certain phenols, as for example, phenol, orthocresol, metacresol, paracresol and guaiacol (a dihydroxy benzene derivative or catechol known as methyl-catechol as discussed by Bloxam "Inorganic and Organic Chemistry", 11th Edition, 1923, page 707); and certain alcohols, as for example, isopropanol, secondary butanol, allyl, isoamyl, diacetone alcohol and cholesterol.

While a large number of substances have been named which possess the property of preventing cloud or gum formation in gasolines it has been found that anthracene is one of the more efficient of the group, or possesses this property to a somewhat greater extent than most of the other members of the group.

It is also true that the type of character of the gasoline treated has some effect on the usefulness of any particular cloud retarding substance. For example it may be necessary with a gasoline from a certain source, to use larger amounts of the particular retarding substance and in some cases to use a different substance since it is obvious that all substances which may be used do not act with equal efficiency. The extensive use of anthracene has shown that gasolines from certain sources and subjected to certain refining treatments require less of the anti-catalyst than other gasolines.

The amount of anti-catalyst used, as intimated above, depends on the gasoline and the particular anti-catalyst employed. In most cases from one half to two pounds of an efficient anti-catalyst (such as anthracene) to the tank car of about two hundred barrels has been found to be sufficient. As an example of the difference between the use of anthracene alone and the use of anthracene followed by earth treatment it was found that 2.81 pounds of anthracene was required to stabilize a tank car of an Oklahoma gasoline whereas only 0.93 pounds were necessary when followed by the earth treatment of the mixture.

No special apparatus is required for carrying out the process it being sufficient to dissolve the anti-catalyst in the gasoline in any convenient manner and thereafter bring the mixture into contact with an earth. The steps of the process may be carried out in the regular refinery agitators and earth treating equipment.

The treatment of the gasoline with fuller's earth after mixing the anti-catalyst therewith gives a more stable gasoline than can be obtained by the use of the anti-catalyst alone. No satisfactory explanation of this added or combined effect of the earth treatment of the mixture has been found, but extensive experimentation has demonstrated the fact that the earth treatment is effective only after mixing the anti-catalyst with the gasoline.

The anti-catalytic substance may be added to the gasoline either before or after the regular and final treatment with sodium plumbite but it is preferably added after the gasoline has been sweetened by the plumbite treatment.

The following examples will illustrate the effect of sunlight on various types of gasoline and the gum or cloud retarding effect of the added anti-catalyst followed by treatment with fuller's earth. In these examples the best grade of anthracene obtainable was used. The fuller's earth employed in the tests had been previously dried at 1000° F. and used in about the proportion of four grams to 100 cc. of gasoline.

*Example No. 1.*—In the following tests the gasoline used was a blend of straight run gasoline derived from Kansas crude and cracked gasoline derived from cracking the gas oil of Kansas crude. This gasoline was sweetened and otherwise ready for market.

Sample A—Gasoline (no anthracene or earth treatment).
Sample B—Gasoline+earth treatment only.
Sample C—Gasoline+4 mgrms. of anthracene per 100 cc. of gasoline.
Sample D—Gasoline+4 mgrms. of anthracene per 100 cc. and treatment with earth after addition of the anthracene.
Sample E—Gasoline+2 mgrms. of anthracene per 100 cc. followed by earth treatment.
Sample F—Gasoline+1⅓ mgrms. of anthracene per 100 cc. followed by earth treatment.
Sample G—Gasoline+0.8 mgrms. of anthracene per 100 cc. followed by earth treatment.

These samples were exposed to sunlight for five hours after which they showed the following condition:—
Sample A—Very cloudy.
Sample B—Quite hazy.
Sample C—Faint haze.
Sample D—Brilliant.
Sample E—Clear.
Sample F—Clear.
Sample G—Hazy.

In comparing the results shown in the above tests it will be noted that the condition of Sample D is much better than the condition of Sample C in which test the same amount of anthracene was used but which received no earth treatment. In Sample G the quantity of anthracene used was probably insufficient.

*Example No. 2.*—The gasoline used in the following tests was a regular 437 end point gasoline refined and ready for market.

Sample A—Plain gasoline (no anthracene or earth treatment).
Sample B—Gasoline + earth treatment only.
Sample C—Gasoline + 1 mgrm. of anthracene per 100 cc. (no earth).
Sample D—Gasoline + 1 mgrm. of anthracene per 100 cc. followed by earth treatment.
Sample E—Gasoline + 2 mgrms. of anthracene per 100 cc. (no earth treatment).
Sample F—Gasoline + 2 mgrms. of anthracene per 100 cc. followed by earth treatment.

These samples after exposure to bright sunlight for six and one half hours showed the following condition:
Sample A—Milky.
Sample B—Milky.
Sample C—Slightly cloudy.
Sample D—Perfectly clear.
Sample E—Faint haze.
Sample F—Brilliant.

The condition of the above samples shows that one half the anthracene followed by earth treatment gives better stability than the full amount of anthracene without earth treatment.

*Example No. 3.*—The gasoline used in the following tests was a special blend of straight run distillate, naphtha and pressure distillate, the straight run and pressure distillates being derived from Winkler crude.

Sample A—Gasoline + earth treatment alone.
Sample B—Gasoline + 5 mgrms. per 100 cc. followed by earth treatment.
Sample C—Gasoline treated by earth after which 5 mgrms. of anthracene per 100 cc. were added.

These samples after exposure to sunlight for three hours showed the following condition:
Sample A—Muddy.
Sample B—Faint haze.
Sample C—Muddy.

The above tests were carried out on a very poor gasoline but they show clearly the difference between using the earth treatment before and after the addition of anthracene.

In the above examples the amount of anti-catalyst has been referred to in terms of milligrams, one milligram being equivalent to about 0.702 lbs. per tank car comprising about 200 barrels of gasoline.

The use of anthracene or other anti-catalyst followed by earth treatment of the gasoline mixture may be combined with the sweetening and bleaching of the gasoline in somewhat the following manner: To raw unsweetened gasoline may be added the desired quantity of anthracene or other inhibiting agent after which the mixture is sweetened in the usual way with sodium plumbite and a small amount of sulfur, then treated with fuller's earth for the purpose of bleaching the gasoline and at the same time stabilize it in accordance with the process of the present invention.

In the commercial operation of the process the proportion of fuller's earth or other earth to be used may vary according to the gasoline being treated but from 10 to 30% by weight of the gasoline will be found sufficient in most cases. As much as 2 lbs. of anti-catalyst may be used per 100 barrels of gasoline.

As to common subject matter this application is a continuation-in-part of the application filed by August P. Bjerregaard on July 30, 1926, Serial No. 126,090 for "Process of treating gasoline and the product thereof".

Having thus described the preferred form of the invention what is claimed as new is:

1. The process of treating gasoline which comprises dissolving therein an organic anti-catalytic agent adapted to remain in the gasoline and prevent precipitation of gummy constituents therein, said agent being selected from the group of aromatic compounds consisting of anthracene and phenanthrene, and contacting the resulting mixture with fuller's earth.

2. The process of inhibiting gum formation in gasoline due to the action of light which comprises refining the gasoline with sodium plumbite, dissolving in the gasoline an organic compound adapted to make the gasoline stable to light, said compound being selected from the group of aromatic hydrocarbons consisting of anthracene and phenanthrene, and thereafter bringing the resulting mixture into intimate contact with fuller's earth.

3. The process of inhibiting gum formation in a motor fuel containing cracked gasoline which comprises dissolving in said gasoline an anti-catalytic organic substance adapted to prevent the formation of gum therein, said substance being used in the ratio of from one half to 2 lbs. to 200 barrels of gasoline, and being selected from the group of aromatic hydrocarbons consisting of anthracene and phenanthrene and thereafter treating the gasoline with a filtering clay.

4. The process of inhibiting gum formation in gasolines which comprises dissolving in the gasoline an organic anti-catalyst adapted to prevent gum formation therein in the ratio of not more than 2 lbs. per 100 barrels of gasoline, said anti-catalyst being selected from the group of aromatic hydrocarbons consisting of anthracene and phenanthrene, and thereafter treating the resulting mixture with fuller's earth.

5. The process of refining gasoline to prevent gum formation which comprises sweetening the gasoline in the usual manner, treating the sweetened gasoline with a filtering earth and adding to the gasoline prior to said earth treatment an anti-catalytic compound comprising anthracene adapted to inhibit gum formation in the gasoline.

6. The process of inhibiting gum formation in gasolines, which comprises mixing with and dissolving in the gasoline, an aromatic hydrocarbon compound acting as an anti-catalyst and selected from the group consisting of anthracene and phenanthrene, and thereafter bringing the resulting mixture into intimate contact with fuller's earth.

7. The process defined by claim 6 in which the quantity of anti-catalyst mixed with gasoline comprises from one half to four pounds of the anti-catalyst to two hundred barrels of gasoline.

8. The process of inhibiting gum formation in cracked gasoline which comprises dissolving in the cracked gasoline a small proportion of a gum inhibiting substance selected from the group of aromatic hydroxylic compounds consisting of phenol, ortho-cresol, meta-cresol, para-cresol and guaiacol, and thereafter contacting the resulting mixture with a filtering clay of the fuller's earth type.

9. The process of inhibiting gum formation in cracked gasoline which comprises dissolving in the cracked gasoline a gum inhibiting substance in the proportion of from one half to four lbs. of the substance to two hundred barrels of gasoline, said substance being selected from the group of aromatic hydroxylic compounds consisting of phenol, ortho-cresol, meta-cresol, para-cresol and guaiacol, and thereafter contacting the resulting mixture with a filtering clay of the fuller's earth type.

10. A motor fuel product which has been subjected to a contact treatment with a filtering clay of the type of fuller's earth, comprising a cracked gasoline and a gum inhibiting substance selected from the group of hydroxylic compounds consisting of isopropanol, secondary butanol, allyl alcohol, isoamyl alcohol, diacetone alcohol and cholesterol, said gum inhibiting substance comprising from one half to four lbs. of each two hundred barrels of the gasoline motor fuel mixture.

11. The process of stabilizing a cracked unsaturated hydrocarbon motor fuel distillate of less readily detonating type normally tending to deteriorate and develop gum-forming constituents, which comprises adding thereto prior to such deterioration a small proportion of a catechol sufficient to substantially inhibit further gum formation in said distillate, and thereafter contacting the resulting mixture with a filtering clay of the fuller's earth type.

12. The process of inhibiting gum formation in cracked gasoline normally tending to develop gum-forming constituents, which comprises adding thereto prior to the development of such constituents a catechol derivative sufficient in quantity to prevent the development of such gum-forming constituents, and thereafter contacting the resulting mixture with a filtering clay of the fuller's earth type.

13. The process of stabilizing a cracked gasoline containing unsaturated hydrocarbon materials and normally tending to develop gum-forming constituents, which comprises adding thereto prior to substantial development of such gum-forming constituents a small proportion of a monohydroxy benzene derivative sufficient to prevent development of such gum-forming constituents, and thereafter contacting the resulting mixture with an adsorptive clay of the fuller's earth type.

14. The process of stabilizing the characteristics of a cracked unsaturated motor fuel of the less readily detonating type normally tending to deteriorate and develop gum-forming constituents, which comprises adding thereto prior to substantial deterioration thereof a small proportion of a hydroxy aromatic compound in quantity sufficient to prevent said deterioration, and thereafter contacting the resulting mixture with an adsorptive clay of the fuller's earth type.

15. The process of inhibiting gum formation in cracked gasoline containing unsaturated constituents and normally tending to develop gum-forming characteristics, which comprises dissolving in the cracked gasoline a small proportion of a phenolic compound in quantity sufficient to prevent the development of such gum-forming constituents, and thereafter contacting the resulting mixture with a filtering clay of the fuller's earth type.

16. The process of inhibiting gum-formation in cracked gasoline, which comprises dissolving in the cracked gasoline a small proportion of a gum-inhibiting substance selected from the group of hydroxylic compounds consisting of isopropanol, secondary butanol, allyl alcohol, isoamyl alcohol, diacetone alcohol and cholesterol, and thereafter contacting the resulting mixture with a filtering clay of the fuller's earth type.

17. The process of inhibiting gum-formation in cracked gasoline containing unsaturated constituents and normally tending to develop gum-forming characteristics, which comprises dissolving in the cracked gasoline a small proportion of a cresol in quantity sufficient to prevent the development of such gum-forming constituents, and thereafter contacting the resulting mixture with filtering clay of the fuller's earth type.

18. The process of inhibiting gum formation in a cracked unsaturated motor fuel of the less readily detonating type normally tending to deteriorate and develop gum-forming constituents, which comprises adding thereto prior to substantial deterioration thereof, a small proportion of a derivative of a hydroxy benzene compound in quantity sufficient to prevent said deterioration, and thereafter contacting the resulting mixture with an adsorptive clay of the fuller's earth type.

AUGUST P. BJERREGAARD.